Jan. 3, 1928.
M. C. MAYO
1,654,984
HUMIDIFIER FOR INTERNAL COMBUSTION ENGINES
Filed Sept. 7, 1922
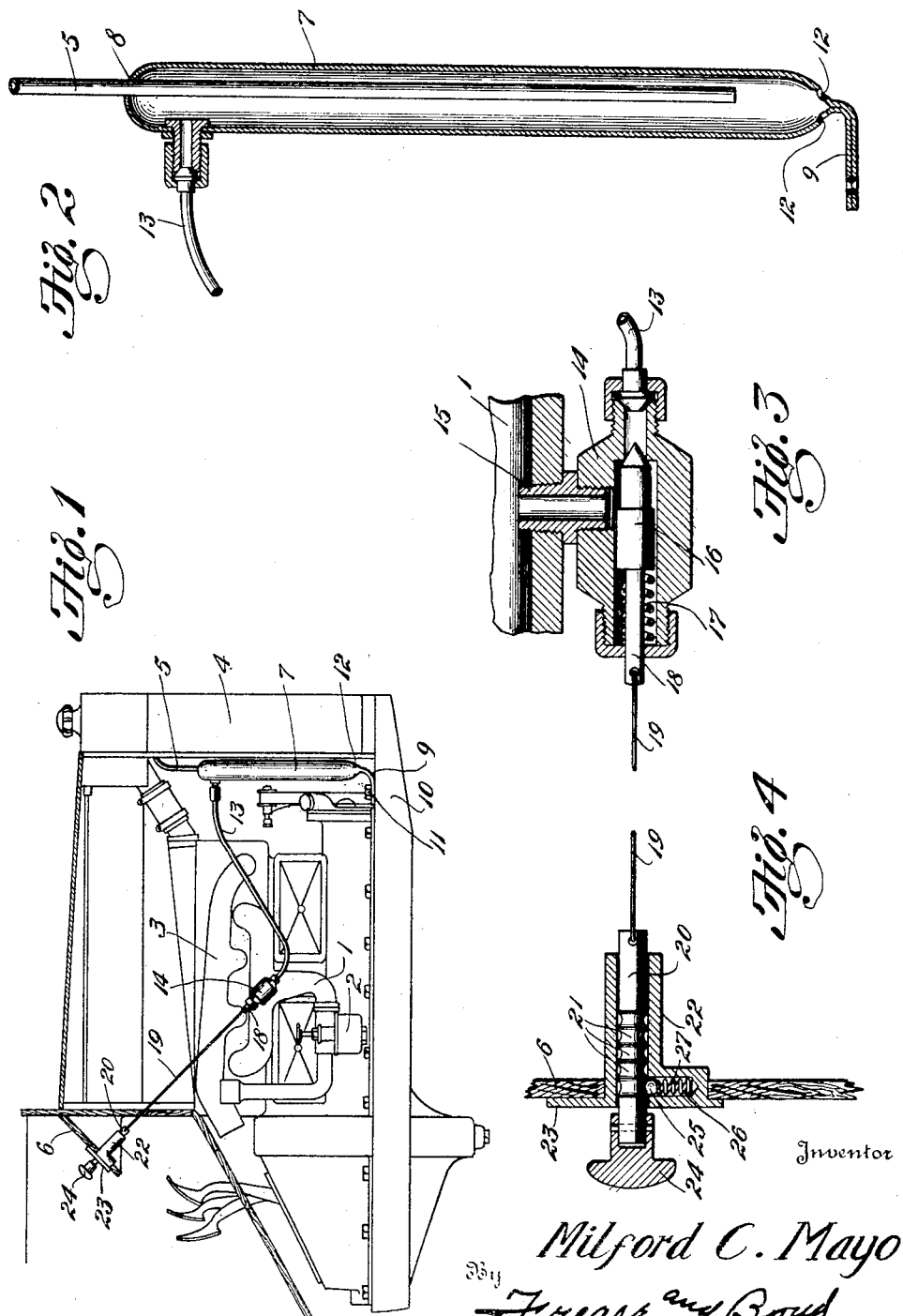
Inventor
Milford C. Mayo
By Frease and Bond
Attorneys Patented Jan. 3, 1928.

1,654,984

UNITED STATES PATENT OFFICE.

MILFORD C. MAYO, OF CANTON, OHIO, ASSIGNOR OF ONE-HALF TO FRANK FOREST, OF CANTON, OHIO.

HUMIDIFIER FOR INTERNAL-COMBUSTION ENGINES.

Application filed September 7, 1922. Serial No. 586,643.

This invention relates to a device for supplying automobile engines with moisture or vapor independently of the carbureter action, and the objects of the invention are to provide an attachment whereby a graduated amount of moisture may be admitted to the engine cylinders so as to supply the cylinders with a proper mixture for the most perfect combustion, and to increase the power of the engine and eliminate to a great extent, carbon deposits within the cylinder and upon the spark plugs.

The above and other objects may be attained by connecting a tube to the usual overflow pipe of the radiator, drain openings being provided in the lower portion of the tube for allowing water overflowing from the radiator to pass out of the tube, a pipe being connected in the upper portion of the tube, at a height sufficient to prevent lifting of water, while permitting vapor or moisture to be drawn therein, this pipe being connected to a valve which communicates with the intake manifold of the engine, means being provided for adjusting the valve to regulate the amount of moisture taken into the cylinders.

An embodiment of the invention is illustrated in the accompanying drawing, in which—

Figure 1 is a general elevation of an automobile engine showing the improved vaporizer applied thereto;

Fig. 2, a sectional view of the tube which surrounds the overflow pipe;

Fig. 3, a sectional view of the valve; and

Fig. 4, a sectional view of the adjusting mechanism which may be mounted upon the dash or instrument board of the automobile.

Similar numerals indicate corresponding parts throughout the drawing.

In the usual automobile engine, with proper adjustment of the carbureter, the gasoline and air which are supplied to the engine from the car are mixed in proper proportions for the requirements of the engine at the starting and during the comparatively slow speeds, when the mixture in the combustion chamber is not subject to as high pressure and temperature as prevails under high speeds when the engine becomes heated and accordingly there is not sufficient air or moisture in the mixture to cause complete combustion when the engine is running at the higher speeds and the ignition takes place more frequently and with less duration.

With the present invention this objection is overcome, and additional air, together with moisture may be admitted into the engine cylinders in proportion to the requirements at increased speeds, by means of an inlet valve connected to a tube surrounding the overflow pipe of the radiator, the valve being located in the intake manifold of the engine and arranged to be manually adjusted from the driver's seat to regulate the amount of air and moisture admitted to the cylinders.

The engine employed for illustrating the invention, includes the intake manifold 1 connected with the cylinders in the usual manner, the carbureter 2 connected to the intake manifold, the exhaust manifold 3, the radiator 4 and the radiator overflow pipe 5. The dash or instrument board of the automobile is shown in section at 6.

A tube 7, of considerably greater diameter than the overflow pipe 5, surrounds the lower portion of the overflow pipe being sealed at its upper end to the overflow pipe as at 8, the lower end of the tube being closed and bent at an angle, forming an attaching lug 9 which may be connected to the frame 10 of the automobile as by a bolt 11, one or more drain apertures 12 being provided in the lower portion of the tube to provide for a constant drainage of any water which overflows from the radiator through the overflow pipe 5.

A pipe 13 is connected to the upper portion of the tube 7 at a sufficient height above the drain apertures 12 to prevent lifting of water through the tube 7, while at the same time vapor or moisture emanating from the overflow pipe will be drawn into the pipe 13 by the suction of the engine cylinders.

A valve casing 14 is provided with a threaded nipple 15 extended into the intake manifold 1, said valve casing being connected at one end to the pipe 13 and having a valve 16 slidably mounted therein and normally held in closed position by means of the coil spring 17 located around the valve stem 18 and interposed between the head of the valve and the adjacent end wall of the valve casing.

A wire or the like 19 connects the valve stem with the grooved shank 20 provided with annular grooves 21 and slidably mounted within the tubular bearing 22 which is located through the dash or instrument board 6 and provided with a face plate 23 connected to said board.

A knob 24 is provided upon the shank 21 for sliding the same within the bearing 22 and for the purpose of holding the shank in any desired adjustment, a pawl 25 is located in the bore 26 and normally urged into the adjacent groove 21 by the compression spring 27.

The operation of the device will be obvious from the above description. When it is desired to increase the supply of air to the cylinders as well as to admit vapor or moisture to the same, the knob 24 will be pulled, opening the valve 16 to the desired extent, the pawl 25 automatically dropping into the proper notch 21 to hold the valve in the adjusted position.

The suction of the cylinders will thus draw vapor or steam from the overflow pipe upward through the tube 7 and through the pipe 13 into the intake manifold. The drain apertures 12 will permit drainage of any overflow of water from the radiator and the pipe 13 being connected near the upper end of the tube 7, water will not be lifted through the tube 7 into said pipe, while the steam or vapor may be drawn from the overflow pipe 5 through the tube 7 and into the cylinders.

I claim:—

1. In combination with an internal combustion engine including a radiator having an overflow pipe and cylinders and an intake manifold, a tube surrounding the greater portion of the overflow pipe and spaced therefrom and provided with drain apertures in its lower portion, the overflow pipe extending to the lower portion of the tube and a pipe connecting the upper portion of said tube with the intake manifold, said pipe being spaced sufficiently above the outlet of the overflow pipe to prevent water from the overflow pipe being drawn into the cylinders.

2. In combination with an internal combustion engine including a radiator having an overflow pipe and cylinders and an intake manifold, a tube surrounding the greater portion of the overflow pipe and spaced therefrom and provided with drain apertures in its lower portion, the overflow pipe extending to the lower portion of the tube, a valve connected to the intake manifold, a pipe connecting the upper portion of said tube to the valve and means for adjusting the valve from the driver's seat.

MILFORD C. MAYO.